United States Patent Office 3,716,775
Patented Feb. 13, 1973

3,716,775
SHORT CIRCUIT PROTECTION MEANS FOR POWER CIRCUITS
Einar Aasen Skogsholm, Erie, Pa., assignor to General Electric Company
Filed July 14, 1971, Ser. No. 162,575
Int. Cl. H02m 5/44
U.S. Cl. 321—5                                    16 Claims

ABSTRACT OF THE DISCLOSURE

A solid state power circuit, such as a polyphase inverter for energizing an A-C motor in an A-C adjustable speed drive system, includes two or more parallel connected series circuits each including a pair of alternately conductive thyristors in series inductive means and a filter network including at least two L-C stages for supplying D-C electric power to the series circuits from a source of electric potential. When a short circuit or shoot-through in the power circuit has occurred or, under some conditions, is about to occur, the resulting high current flow to the series circuits from the filter network is detected and all of the thyristors of at least two of the series circuits are turned on simultaneously in response to the detected current such that the filter capacitor of the L-C stage adjacent the series circuits will resonate with the total effective parallel inductance in the series circuits to provide sufficient reverse voltage to turn off all of the thyristors. To respond to increased current flow resulting from a wide range of fault conditions in an effective and economical manner, the detection means is responsive to the capacitive current flow in at least two of the L-C stages including the two stages adjacent the series circuits. A diode or similar rectifier is provided across the filter inductor of the L-C stage adjacent the series circuits to prevent excessive voltage on the resonating capacitor, to control ripple voltage, and to prevent undamped oscillations in the filter network.

BACKGROUND OF THE INVENTION

Field of the invention

The invention relates to short circuit protection means for power circuits such as inverter circuits for A-C adjustable speed drive systems and, more particularly, to means for promptly detecting excessive current flow to the power conversion apparatus and automatically responding to excessive current flow to protect the system components against destructive current and voltage levels.

Description of the prior art

This invention is particularly applicable to the protection of inverter power circuits in drive systems of the general type disclosed and claimed by copending patent application Ser. No. 81,758, entitled "Adjustable Speed Polyphase A-C Motor Drive," filed on Oct. 19, 1970, in the names of Carlton E. Graf and Werner K. Volkmann, and by copending patent application Ser. No. 81,757, entitled "Synchronous Time Ratio Control Power Regulator," filed on Oct. 19, 1970, in the name of Carlton E. Graf, both applications being assigned to the assignee of this invention. While the present invention will be described herein in connection with a drive system of the type taught by the aforesaid patent applications to the extent necessary for a full and complete understanding of the invention, a more complete understanding of such inverter circuits may be obtained from the aforesaid patent applications.

In inverter power circuits of the type taught by the aforesaid patent applications, the apparatus for changing D-C electric power to adjustable frequency A-C electric power includes a number of series circuits connected in parallel across a D-C power source. Each of the series circuits includes a pair of thyristor devices, or gate controlled rectifiers, such as silicon controlled rectifiers. As will become apparent as this description proceeds, these thyristors are "fired" or turned "on" by a suitable control apparatus in a prescribed sequence so as to produce the desired power output. It is imperative, however, that both thyristors in a single series circuit not be conductive, i.e. turned "on," simultaneously. If this were to happen, the effective result would be a short circuit across the source and a rapidly rising current through the series circuit in which both thyristors are conductive. Unless the thyristors are selected to withstand such currents, a short circuit, or "shoot-through," will destroy the thyristors by causing the current to exceed the capacity of the devices. Since it is not practical from an economic standpoint to design the circuits so that the thyristors of a single series circuit can carry a shoot-through current, it is desirable that a shoot-through be detected promptly and that means be provided for automatically protecting the circuit elements against the high current levels associated with a shoot-through. Shoot-throughs can be caused by many conditions including erratic behavior of the thyristor gating circuits such that one thyristor is gated on before the other is commutated off. Erratic signals can be produced due to system malfunctions or as a result of "noise" improperly interpreted as gating signals. Various load conditions, such as a partial shorting of the windings of a driven motor, can result in the drawing of an overcurrent such that one thyristor is not fully commutated "off" before the other is gated "on," the result being a shoot-through.

The desirability of providing shoot-through protection in power circuits has been recognized heretofore. Specifically, it has been proposed in the past that the L-C filter network of one or more stages be provided between D-C source and an inverter and that the current in the capacitor in parallel with the inverter circuits be monitored. If the capacitive current exceeds a predetermined level, all of the main thyristors are fired and subsequently commutated off due to oscillation of the inverter inductance and the parallel capacitor. While this approach has been satisfactory with respect to pure shoot-through conditions, it has not been entirely satisfactory where the shoot-through occurs as a result of a pre-existing overcurrent condition.

SUMMARY OF THE INVENTION

It is therefore an object of this invention to provide improved means for protecting thyristors and other power circuit elements against excessive current levels associated with shoot-though conditions.

Another object of this invention is to provide fast acting means for automatically protecting thyristors and other circuit elements against excessive current levels resulting from shoot-throughs and the like.

Another object is to provide means for anticipating shoot-throughs which would normally occur as a result of abnormal load conditions and preventing the actual occurrence of such shoot-throughs.

A further object of the invention is to provide protective means in accordance with the foregoing objects which does not interfere with the normal operation of the power systems.

A still further object is to provide protective means in accordance with the foregoing objects which is relatively simple, reliable, and inexpensive.

Briefly stated, in carrying out the invention in one form, a power circuit includes a power conversion apparatus comprising a plurality of circuits each including a pair of similarly poled thyristors and inductive means connected in series. The series circuits are connected in parallel with a capacitor, the capacitor being in the last stage of a multiple stage L-C filter network in which the first stage is adapted for connection to a source, such as a D-C source, of electric power. To sense current flow from the source to the power conversion means, and, consequently, the thyristors, detection means are provided for detecting the current flow through the capacitive means of at least the last two L-C stages of the filter network. When the detected current exceeds a predetermined level, an overcurrent signal is produced, and the gating means for turning "on" the thyristors responds to the overcurrent signal by turning on simultaneously all of the thyristors of at least two of the series circuits. As a result, the capacitor of the last stage will resonate with the total effective inductance of the series circuits connected in parallel with the capacitor so as to commutate off all of the thyristors.

By a further aspect of the invention, a rectifier is connected in parallel with the inductor of the last L-C stage to substantially prevent ripple voltage on the capacitor during inverter operation and voltage overswings, and undamped oscillation in the filter network. By a still further aspect of the invention, the inductance of each L-C stage is less than the inductance of the next preceding stage and the capacitance of each L-C stage is less than the capacitance of the next preceding stage. In accordance with a still further aspect of the invention, the current detection means comprises a current transformer coupled to sense the current flow through the capacitive means of the last two L-C stages of the filter network.

BRIEF DESCRIPTION OF THE DRAWINGS

While the novel features of this invention are set forth with particularity in the appended claims, the invention, both as to organization and content, will be better understood and appreciated, along with other objects and features thereof, from the following detailed description taken in conjunction with the drawings in which:

DETAILED DESCRIPTION

Figure 1:
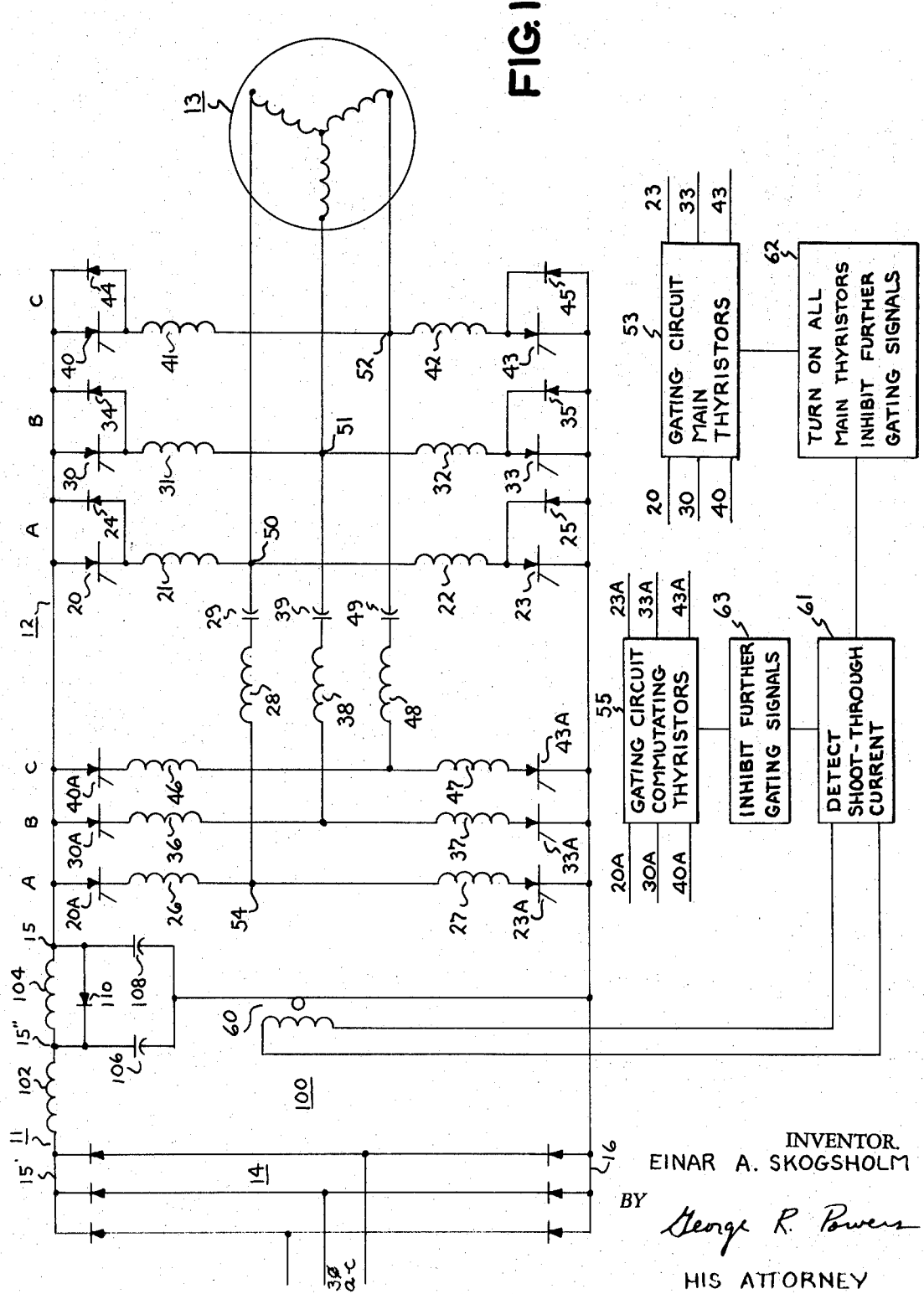
FIG. 1 is a schematic circuit diagram of a three-phase inverter circuit modified to include the shoot-through protection means of this invention.

The basic units of the adjustable A-C drive system shown in FIG. 1 include a D-C power supply 11, a variable frequency, variable voltage polyphase inverter 12, and a polyphase A-C motor 13 which is preferably an A-C induction motor. The D-C power supply 11 is conveniently energized from a commercially available source of three-phase alternating current electrical potential, and includes a three-phase full wave rectifier such as the diode rectifier bridge 14 that is illustrated which comprises six diodes arranged in a conventional manner. The full wave diode rectifier 14 provides a pulsating D-C potential between its output terminals 15' and 16 that is filtered or smoothed by a suitable filter network 100 including a pair of series connected filter inductors 102 and 104, a pair of shunt connected filter capacitors 106 and 108, and a diode 110. More particularly, it will be noted that the filter network 100 is a multiple stage L-C network comprising a first stage consisting of the inductor 102 and the capacitor 106 and a second stage consisting of the inductor 104 and the capacitor 108. The first stage may be viewed as being adjacent the output terminals 15' and 16 of the full wave rectifier 14 (also input terminals 15' and 16 of the filter network) and the second stage may be viewed as being remote from the output terminals 15' and 16 (filter input terminals). It will be readily apparent that the full wave solid state rectifier 14 can be replaced by other equivalent sources of D-C potential such a single phase rectifier or a battery. Furthermore, the filter network 100 may include additional L-C stages, but comprises at a minimum the two L-C stages illustrated by FIG. 1.

The inverter circuit 12 is constructed in the three-phase bridge configuration and employs the McMurray type commutation as described in the aforesaid patent applications and as described and claimed in U.S. Pat. No. 3,207,974 to McMurray, dated Sept. 21, 1965, and assigned to the assignee of this invention. In accordance with the McMurray mode of commutation, an auxiliary thyristor is turned on to produce a reverse pulse of commutating current that reduces the current in a main load current carrying thyristor to below its holding value and commutates it off. Accordingly, a first main phase of the inverter 12 comprises a series circuit including a main load current carrying thyristor 20 and a series connected protective inductor 21, and a second protective inductor 22 connected in series with a second main load current carrying thyristor 23. This series circuit is connected across the capacitor 108 of the last L-C stage of the filter network to receive D-C input current therefrom. The main thyristors 20 and 23 are poled in the same direction and are preferably unidirectional conducting silicon controlled rectifiers, although other equivalent controllable rectifiers can be used. Feedback diodes 24 and 25 are connected in inverse parallel relationship directly across the load terminals of the respective main thyristors 20 and 23. These feedback rectifiers conduct excess commutating current during the commutating interval and provide a path for reactive load current. The junction point 50 of the protective inductors 21 and 22 in main phase A is connected to one of the Y-connected motor windings of the A-C motor 13. The motor windings could also be delta-connected. The main thyristors 20 and 23 can be considered as switches which alternately connect the positive D-C side 15 of the capacitor 108 and the negative D-C supply terminal 16 to the motor winding. The second main phase (phase B) of the inverter 12 comprises a series circuit including main load current carrying thyristors 30 and 33 and their respective protective inductors 31 and 32, and the associated inverse-parallel connected feedback diodes 34 and 35. The junction point 51 of the second main phase is connected to a second motor winding, while the junction point 52 of the third main phase (phase C) comprising the similarly numbered components 40 to 45 is connected to the third motor winding.

The silicon controlled rectifier is a unidirectional conducting gate controlled thyristor, and is more particularly a solid state device wherein conduction through the device can be initiated when the anode electrode is positive relative to the cathode electrode by the application of a gating signal to its gating control electrode, but thereafter the gating signal loses control over the conduction through the device and in order to render it non-conductive or commutated off, it is necessary to reduce the current through the device below the holding current and to reverse bias it by making the anode potential negative relative to the cathode potential. The gating signals for rendering the main thyristors conductive in the appropriate order to supply three-phase stepped wave voltage to the A-C motor 13 are generated in a gating circuit 53 which is not illustrated in detail because such control circuits are conventional. Suitable gating circuits which may be used are described for instance in the Silicon Controlled Rectifier Manual, 4th edition, published by the Semiconductor Products Department, General Electric Company, Syracuse, New York, copyright 1967. The commutating circuits for the main thyristors operate and are controlled substantially independently of the protective system of this invention.

The commutation circuit for the first main phase comprises a series circuit connected directly between the positive D-C supply side 15 of the capacitor 108 and the negative D-C supply terminal 16, the circuit including an auxiliary commutating thyristor 20A connected in series with two protective inductors 26 and 27 and a secondary auxiliary commutating thyristor 23A. The junction point 54 between the two protective inductors 26 and 27 is connected to a commutating inductor 28 that is in turn connected in series with a commutating capacitor 29 to the junction point 50.

To explain briefly the operation of the commutating circuit, let it be assumed that the main thyristor 20 is conducting current to the load 13 and that as the result of a previous half cycle of operation the commutating capacitor 29 is charged such that the point 50 is positive with respect to the point 54. When it is desired to commutate off the main thyristor 20, the auxiliary commutating thyristor 20A is gated on by a gating signal from commutating gating circuit 55, thereby connecting the series oscillatory circuit comprising the commutating inductor 28 and the commutating capacitor 29 across the load terminals of the main thyristor 20 through the protective inductors 21 and 26. A discharge pulse of current is produced by this series resonant circuit that reduces the current in the main thyristor to zero. The feedback diode 24 is then forward biased and conducts excess commutating current while at the same time reverse biasing the main thyristor 20 for a period greater than the turn-off time so that it turns off. When the commutating capacitor 29 has charged to the reverse polarity, the point 54 is then more positive than the positive D-C supply terminal 15 so that the auxiliary thyristor 20A is rendered non-conductive. As the main thyristor 20 turns off, reactive load current can circulate through the opposite feedback diode 25 and desirably charges the commutating capacitor 29 to a value dependent partly on the magnitude of the load current. If desired, a resistor can be placed in series with the commutating inductor 28 and commutating capacitor 29 to limit the voltage to which the commutating capacitor 29 is charged. At a selected point, the main thyristor 23 can be rendered conductive by a gating signal applied to its gate electrode, and the commutating capacitor 29 has the appropriate polarity to commutate it off when the auxiliary commutating thyristor 23A is gated on. In like manner, the commutating circuits for the main phase B thyristors 30 and 33 include the series connected auxiliary thyristors 30A and 33A and the commutating components 36 to 39. The commutating circuits for the main phase C thyristors 40 and 43 are provided by the series connected auxiliary thyristors 40A and 43A and commutating components 46 to 49. Further details on the operation of the commutating circuits can be obtained, if desired, by referring to the aforesaid McMurray patent.

An inverter of this type in which the frequency of the commutating circuits can be considerably higher than the frequency of the output voltage, is especially suitable for use as a variable frequency, variable voltage inverter in an adjustable speed A-C drive system. It is necessary to vary the voltage applied to the terminals of the A-C induction motor as a function of frequency in order to maintain constant flux in the machine. The voltage must be held within a relatively narrow range at any one frequency in order to provide proper excitation. This can be accomplished by time ratio control or pulse width modulation techniques inside the inverter using the same thyristors to control the voltage as are used to control the frequency, the details as to how this may be accomplished being taught by the aforesaid patent application Ser. No. 81,757 to Graf.

During operation of the drive system, an overcurrent or shoot-through condition can occur in any of the three main phase circuits or any of the three commutating phase circuits, each preferably comprising two thyristors connected in seres circuit relationship inductive means such as a pair of protective inductor elements as illustrated. There are three main categories of causes that can produce a potentially destructive shoot-through condition in the inverter 12 for supplying electric power to the A-C induction motor 13. There may be a load overcurrent due to some malfunction in the load itself, such as saturation of the motor, short circuiting of the motor leads, or an overload. In this case, the level of current through the main thyristors may be such that the commutating circuits fail to effect commutation of one thyristor prior to the gating "on" of the other thyristor in the same circuit. Noise problems in the gating circuits for the thyristors can result in the production of spurious or irregularly timed gating signals, or can create transients that result in irregular gating signals. In this case the series related second thyristor may be gated on before the first thyristor is commutated off. Furthermore, the power circuitry itself can produce voltages or currents that exceed the ratings of the thyristor devices, as for example, during regeneration by the motor.

With the circuit arranged as shown in FIG. 1, in which the filter inductor 104 serves as an isolating impedance between the filter capacitor 108 and the first stage of the filter 100, simultaneous conductance of the two thyristors in any one of the main or commutating phases, commonly known as a "shoot-through," automatically places the thyristors and protective inductor elements of that circuit in a series resonant circuit relationship with the filter capacitor 108. During the first half cycle of oscillation of the series resonant circuit so produced, the polarity of the filter capacitor 108 is reversed, and for a three-phase inverter circuit the reverse current produced during the second half cycle of oscillation is ineffective to commutate off the conducting series thyristors because the feedback diodes in the three main phases are then forward biased and provide three parallel paths for the reverse current. It can be shown by mathematical calculations that (assuming that the protective inductors in the parallel circuit branches of the main phases to be all equal) a reverse current having a sufficient magnitude and period to commutate off the two short circuited thyristors can be produced when the total effective inductance with current flowing in the reverse direction from supply terminal 16 toward supply terminal 15 is one-half of the total effective inductance with current flowing in the forward direction from terminal 15 toward terminal 16. In a two-phase circuit, or a bridge configuration circuit with two parallel connected series circuit branches, the circuit would be on the threshold of automatically commutating off the short circuited series thyristors but could not be considered to be reliable. In a three-phase circuit, for a shoot-through in a main phase, the total effective inductance with current flowing in the reverse direction is only one-third of the total effective inductance with current flowing in the forward direction, and the two short circuited series thyristors are not commutated off. The situation is no better when the shoot-through occurs in one of the commutating phases in the FIG. 1 circuit configuration.

In accordance with one aspect of the invention, successful commutation of the thyristors following a shoot-through can be obtained by detecting the shoot-through current and then gating on all of the main phases load current carrying thyristors. Thus, when a short circuit condition occurs in one of the main phases in FIG. 1, such as main phase A, thyristors in main phases B and C are triggered on. When one of the commutating phases is short circuited, then all six thyristors in main phases A, B and C are triggered on. In this way, the total effective inductance of the series resonant circuit including the filter capacitor is the same during the first half cycle of oscillation, when current flows from terminal 15 toward terminal 16, as during the second half cycle of oscillation when current flows in the reverse direction. This provides for a normal half cycle of operation in the added phases, and the difficulties with parallel phases participating in only a portion of the half cycle as previously described is avoided. An additional advantage is that the shoot-through current is distributed to at least the series circuits of three phases and the current per series circuit or phase is decreased.

The series resonant circuit formed by filter capacitor 108 and the total effective inductance of the parallel connected protective inductors in the main phases is selected so that at the tuned frequency the reverse current is supplied for a period of time sufficient to commutate off all the conducting thyristors. In the event that the need for the protective inductors is eliminated by further developments, then the total effective inductance of the circuit resulting from the shoot-through should be of a value to provide a circuit which will resonate with the filter capacitor at a frequency which will supply the necessary reverse current to commutate off the thyristors.

When a shoot-through occurs, i.e. when both thyristors of one of the series circuits are simultaneously conductive, the effective result is a short circuit between the D-C terminals 15 and 16 with an extremely rapid rise in current since the inductance of the inductors in the series circuits is relatively small. The current to be circulated in the simultaneously conducting thyristors in the short circuited series circuit is derived mainly by a rapid discharge of the filter capacitor 108, the inductor 104 having sufficient inductance to substantially isolate the capacitor 108 from the D-C source 11 and the first stage of the L-C filter network 100. Under such conditions, a convenient way to sense the occurrence of the shoot-through is to detect the large change in the current flowing between terminals 15 and 16 through the capacitor 108. In accordance with the present invention, this current sensing is provided by detection apparatus including a current transformer 60 having its primary winding in series with the capacitor 108 between the supply terminals 15 and 16 and its secondary winding connected to an appropriate circuit 61 for detecting when the sensed current exceeds a predetermined level. It will, of course, occur to those skilled in the art that the current transformer 60 will also sense any current flowing between junctions 16 and 15″ through the capacitor 106. However, as indicated above, under shoot-through conditions, the inductor 104 has sufficient inductance to substantially isolate the capacitor 106 from the effect of the shoot-through. Accordingly, the current through the capacitor 106 will be negligible and it may be considered that the current transformer 60 senses only the capactive current of the final L-C stage.

The current for the commutating phases of the inverter 12 during the commutating interval is derived partially by discharge of the filter capacitor 108, but the level of current required for commutation is not as high as will occur during a shoot-through. The level of current recognized by the detection circuit 61 as representing an excessive current condition is set sufficiently high that an overcurrent signal is not produced by the detection circuit 61 during normal operation of the inverter circuit 12. In the preferred form of the invention, the output of the detection circuit 61 energizes a circuit 62 which commands the main thyristor gating circuits 53 to supply gating signals to all six main thyristors simultaneously, and to inhibit further gating signals. Following correction of the overcurrent condition, all of the main thyristors 20, 23, 30, 33, 40 and 43 will then be turned off to completely shut down the inverter. The detection circuit 61 also energizes a circuit 63 which commands the commutating thyristor gating circuits 55 to inhibit further gating signals.

Let it now be assumed that load conditions become such that a load overcurrent is drawn from the inverter 12. Such a load overcurrent may be produced, for example, by a partial shorting of the motor windings. If the protection means of this invention were not operative, a typical result of such an overcurrent condition would be a gradual reduction of the voltage on the capacitor 108 of the filter network 100. Due to the reduced voltage on the capacitor 108 in combination with the increased load current, normal commutation of the conducting thyristors might be impossible. In such a case, a second series thyristor will be gated on while the first series, thyristor is still conducting so as to produce a shoot-through. Since, however, the voltage on the capacitor 108 has dropped as a result of the load overcurrent condition, shoot-through commutation by gating on of all of the load current carrying thyristors as taught above may well be impossibe at this point in time. To shut down the inverter in this situation, it is necessary to recognize that a shoot-through is likely to occur as a result of a load overcurrent and to turn on the thyristors before the voltage on the capacitor has been reduced to any significant extent.

Heretofore, it has been proposed in the art that detection means be utilized for sensing the capacitive current in the last stage of a multiple stage L-C filter network and turning all of the main thyristors of an inverter when the detected current exceeds a predetermined level. Such apparatus functions in the manner described above with respect to a pure shoot-through situation. It has been found, however, that such an approach is not altogether satisfactory when the drive system fault resides in the load such that the shoot-through is merely a delayed result of a load overcurrent situation. Where the last stage capacitor slowly discharges, the last stage capacitive current flow may be insufficient to indicate the existence of a fault condition, much of the excess load current being supplied through discharge of the capacitor of the next preceding L-C stage. Under such circumstances, the ideal approach would be to sense total current flow to the inverter and gate on all of the main load thyristors when the total current flow exceeds a predetermined level.

By utilizing at least a two stage L-C network between the diode rectifier 14 and the inverter 12 and detecting the total current flow in the capacitors of at least the last two stages, a close approximation of the total current flow to the inverter can be obtained even where there may be only a gradual change or even no change in the voltage of the last stage capacitor. Accordingly, the current transformer 60 as illustrated by FIG. 1 is sensitive to the total current flow in both capacitors of the illustrated two stage filter network. Under pure shoot-through conditions, the current transformer 60 will, as explaned previously, be effectively responsive to only the fast charging current through the capacitor 108. Under overcurrent conditions leading up to a shoot-through, however, the transformer 60 will be responsive to the current in capacitor 106 as well as 108. When the total detected current reaches the predetermined level, an overcurrent signal will be produced by the detection circuit 61 to cause the circuit 62 to gate on all six main thyristors simultaneously. Circuit 63 will then be effective to inhibit the generation of further gating signals to the main and commutating thyristors. An important feature of the present invention is that means are provided for detecting at least a close approximation of the total current flow to the inverter so that incipient shoot-throughs can be anticipated and corrective action taken in a timely manner. It has been found that such a close approximation can not be obtained with the prior art approach of sensing only the current in a single capacitor of single or multiple stage filter networks.

The diode 110 of the illustrated and preferred embodiment of the invention has several important functions. Apart from its functions relative to shoot-through protection, it tends to reduce the ripple voltage that would otherwise be present during normal operation of the inverter by holding the voltage on the capacitor 108 to that of the much larger capacitor 106. The diode 110 also prevents the development of undamped oscillation in the closed loop circuit comprised of the inductor 104 and the capacitors 106 and 108 by short circuiting the inductor 104. During shoot-through operation, the diode 110 provides voltage protection for the capacitor 108 and the inverter components by holding the voltage on the capacitor 108 to that of the larger capacitor 106.

As indicated, the capacitor 108 has much smaller capacity than that of the capacitor 106. Also, the inductor 104, which is sufficiently rage to isolate the capacitor 108 from the remainder of the D-C source 11 during shoot-through commutation, is much smaller than the first stage inductor 102. For example, it has been found that the capacitance of the capacitor 106 should be 10 to 20 times greater than the capacitance of capacitor 108. Similarly, the inductance of the inductor 102 should be 5 to 15 times as great as that of the inductor 104. For example, in a drive system utilizing a motor in the 35 to 50 H.P. range, it has been found desirable that the filter components have approximately the following ratings:

| | | |
|---|---|---|
| Capacitor 106 | mf | 12,600 |
| Capacitor 108 | mf | 775 |
| Inductor 102 | mh | 0.8 |
| Inductor 104 | mh | 0.1 |

It is also preferable in some applications that the capacitors be packaged as a number of parallel capacitors each associated with a respective phase of the inverter 12. It will, of course, be obvious that such packaging would have no effect on the overall operation of the filter network and the shoot-through protection means. Due to the necessity that the capacitor 108 oscillate with the total inductance of the inverter series circuits, it should be of the non-polarized type. The much larger capacitor 106, however, may be of the relatively less expensive polarized type.

In the foregoing description, it has been stated that circuit 63 inhibits the application of further gating signals after the inverter 12 has been stopped by simultaneous gating of all of the main thyristors by the circuit 62. The advantage of completely stopping the inverter 12 after operation of the protection system is that the operator is warned that there may be some underlying cause of the mis-operation or the malfunction that may need to be corrected. If successive shoot-throughs occur upon restarting the inverter 12 once or twice again, it will be evident that corrective action is needed. While it is possible to automatically restart the inverter circuit 12 after commutating off all of the main thyristors to heal a short circuit condition, it is pointed out that the shoot-through protection circuit will not be operative again until the filter capacitor 108 has been recharged to its normal polarity. In any event, it will be realized that the essential details of the shoot-through protection system as herein described will be the same regardless as to whether there is a complete shutdown following a shoot-through or whether there is an automatic restart, except that it will not be necessary to inhibit further gating signals to the main thyristors and the commutating thyristors (see circuits 62 and 63).

Figure 2:
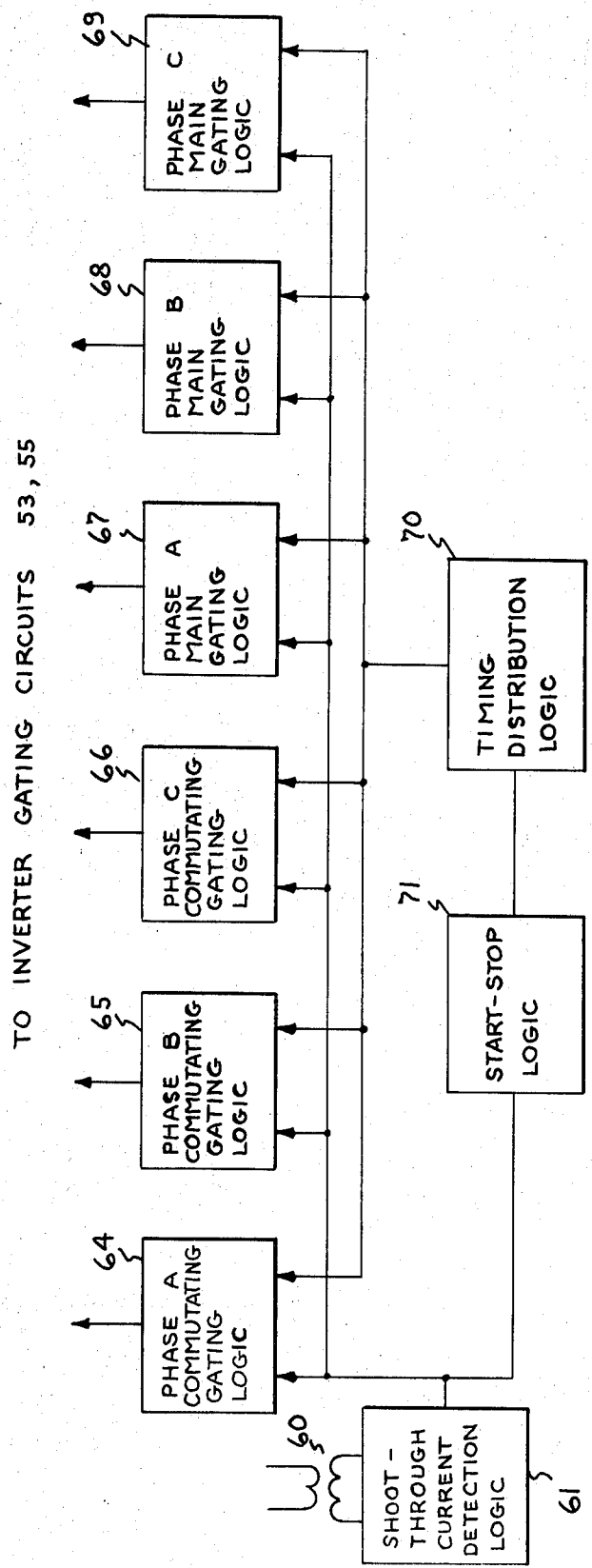
FIG. 2 is a schematic block diagram illustrating more specifically the actuation of the thyristor gating circuits resulting from the detection of an overcurrent condition by the shoot-through protection means.

It is preferred that the function of the circuits 62 and 63 be included in the logic circuits that normally determine the timing and sequence of generating gating signals for the commutating thyristors and the main thyristors. This is shown diagrammatically in FIG. 2 to the extent believed necessary to understand the present invention. The commutation phase gating logic is represented by the blocks 64-66 while the main phase gating logic is represented by the blocks 67-69. The operation of these logic circuits is normally determined by the timing distribution logic indicated generally by the block 70 which has as inputs, not here illustrated, the necessary information to operate the three-phase motor 13 at the desired speed. The shoot-through current detection by logic circuit 61 is also an input to these gating logic circuits 64 to 69. Inasmuch as operation of the shoot-through protection system involves bringing the motor 13 to a stop, the circuit 61 is also connected to the start-stop logic circuit 71 that is employed in starting and stopping the motor in normal operation.

In summary, an inexpensive, reliable, and relatively simple protection system is provided for automatically responding to the occurrence or incipient occurrence of shot-throughs in a power circuit. In the preferred embodiment of this invention, the shoot-through or incipient shoot-through is in a variable frequency, variable voltage inverter for an A-C adjustable speed drive system.

While the invention has been particularly shown and described with reference to a preferred embodiment thereof, it will be understood by those skilled in the art that various changes in form, details and application may be made therein without departing from the spirit and scope of the invention. For example, those skilled in the art will appreciate that the protection system just described is particularly adapted for providing transient overcurrent protection. Furthermore, since the protection system acts extremely rapidly, it is suited for use as an instantaneous overcurrent protection system in combination with slower-acting overcurrent protection systems. Accordingly, it is intended that all such modifications and changes be included within the scope of the appended claims.

What is claimed as new and is desired to secure by Letters Patent of the United States is:

1. A power circuit comprising:
   a filter network comprising a pair of input terminals for connection to a source of electric potential and a plurality of L-C filter stages,
   power conversion means comprising a plurality of series circuits each connected in parallel across the capacitive means of the L-C stage most remote from said pair of input terminals, each of said series circuits including inductive means and a pair of similarly poled thyristor devices,
   gating means for rendering said thyristor devices conductive and commutating means for turning off said thyristor devices, said gating means and said commutating means normally operating in a predetermined sequence such that the pair of thyristor devices in any one of said series circuits are not conductive simultaneously,
   detection means responsive to at least a portion of the current flow to said power conversion means including the capacitive current flow in at least the two L-C stages most remote from said pair of terminals for producing an overcurrent signal when the detected current exceeds a predetermined level,
   said gating means coupled to said detection means and being responsive to an overcurrent signal for rendering all of the thyristor devices of at least two of said series circuits simultaneously conductive.

2. A power circuit as defined by claim 1 wherein said filter network further comprises a rectifier connected in parallel across the inductive means of the L-C stage most remote from said pair of terminals to prevent excessive voltage on the capacitive means of said most remote L-C stage.

3. A power circuit comprising:
   a filter network comprising a pair of input terminals for connection to a source of electric potential and a plurality of L-C stages,
   power conversion means comprising a plurality of series circuits each connected in parallel across the capacitive means of the L-C stage most remote from said pair of input terminals, each of said series circuits including inductive means and a pair of similarly poled thyristor devices,
   gating means for rendering said thyristor devices conductive and commutating means for turning off said thyristor devices, said gating means and said commutating means normally operating in a predetermined sequence such that the pair of thyristor devices in any one of said series circuits are not conductive simultaneously,
   and a rectifier connected in parallel across the inductive means of the L-C stage most remote from said pair of terminals for preventing the voltage on the capacitive means of said most remote L-C stage from substantially exceeding the voltage on the capacitive means of the next most remote L-C stage.

4. A power circuit as defined by claim 3 further comprising a plurality of feedback rectifiers each connected in reversely poled relationship across a respective one of said thyristor devices, all of the thyristor devices of at least two of said series circuits having said reversely poled rectifiers associated therewith, and wherein the inductance of each L-C stage is less than the inductance of the next less remote L-C stage and the capacitance of each L-C stage is less than the capacitance of the next less remote L-C stage.

5. A power circuit as defined by claim 4 further comprising detection means responsive to at least a portion of the current flow to said power conversion means including the capacitive current flow in at least the two L-C stages most remote from said pair of input terminals for producing an overcurrent signal when the detected current exceeds a predetermined level, said gating means coupled to said detection means and being responsive to an overcurrent signal for rendering all of the thyristor devices of at least two of said series circuits having said feedback rectifiers simultaneously conductive.

6. A power circuit as defined by claim 5 further comprising means to at least temporarily inhibit said gating means from rendering said thyristor devices conductive in the normal predetermined sequence subsequent to the simultaneous rendering of all of the thyristor devices of said at least two series circuits conductive in response to an overcurrent signal.

7. A power circuit as defined by claim 6 in which the inductive means of the series circuits of which all thyristor devices are rendered simultaneously conductive in response to an overcurrent signal all have substantially the same inductance.

8. An A-C adjustable speed drive system comprising:
a polyphase A-C motor,
a filter network comprising a pair of input terminals for connection to a source of D-C electric power, a pair of output terminals, and a plurality of L-C stages each comprising an inductive means and a capacitive means, the capacitive means of the L-C stage most remote from said input terminals connected across said output terminals,
static power conversion means for producing variable frequency output polyphase electric power, said conversion means including a plurality of output phases each connected to a respective phase of said motor, said conversion means further comprising a plurality of series circuits each connected in parallel across said output terminals of said filter network to receive electric power therefrom, each of said series circuits including a pair of similarly poled thyristor devices and inductive means,
gating means for rendering said thyristor devices conductive and commutating means for turning off said thyristor devices, said gating means and said commutating means normally operating in a predetermined sequence such that the pair of thyristor devices in any one of said series circuits are not conductive simultaneously,
detection means responsive to at least a portion of the current flow to said power conversion means including all of the capacitive current flow in at least the two L-C stages most remote from said pair of input terminals for producing an overcurrent signal when the detected current exceeds a predetermined level said gating means coupled to said detection means and being responsive to an overcurrent signal for rendering all of the thyristor devices of at least two of said series circuits simultaneouly conductive.

9. An A-C adjustable speed drive system as defined by claim 8 wherein said filter network comprises two L-C stages and said detection means includes a current transformer for detecting current flow.

10. An A-C adjustable speed drive system as defined by claim 9 wherein said filter network comprises first and second inductive means connected in series between a first one of said input terminals and a first one of said output terminals, a first capacitive means connected between the junction of said first and second inductive means and the second ones of said input terminals and said output termianls, and a second capacitive means connected between said first output terminal and the second one of said input terminals and said output terminals, said first inductive means and said first capacitive stage comprising the L-C stage adjacent said input terminals and second inductive means and said second capacitive means comprising the L-C stage remote from said input terminals.

11. An A-C adjustable speed drive system as defined by claim 10 wherein said current transformer is coupled to said filter network to generate an output proportional to the current flow of said first and second capacitive means.

12. An A-C adjustable speed drive system as defined by claim 10 further comprising a rectifier connected in parallel across said second inductive means for preventing the voltage on said second capacitive means from substantially exceeding the voltage on said first capacitive means.

13. An A-C adjustable speed drive system as defined by claim 12 further comprising a plurality of feedback rectifiers each connected in reversely poled relationship across a respective one of said thyristor devices, all of the thyristor devices of said at least two series circuits having said reversely poled rectifiers associated therewith, and wherein the inductance of said first inductive means is greater than the inductance of said first inductive means and the capacitance of said first capacitive means is greater than the capacitance of said second capacitive means.

14. An A-C adjustable speed drive system as defined by claim 13 further comprising means to at least temporarily inhibit said gating means from rendering said thyristor devices conductive in the normal predetermined sequence subsequent to the simultaneous rendering of all of thyristor devices of said at least two series circuits conductive in response to an overcurrent signal.

15. An A-C adjustable speed drive system as defined by claim 14 in which the inductive means of the series circuits of which all thyristor devices are rendered simultaneously conductive in response to an overcurrent signal have substantially the same inductance.

16. An A-C adjustable speed drive system as defined by claim 15 wherein said current transformer is coupled to said filter network to generate an output proportional to the current flow of said first and second capacitive means.

References Cited

UNITED STATES PATENTS

| 3,321,697 | 5/1967 | Etter | 321—45 C |
|---|---|---|---|
| 3,621,362 | 11/1971 | Schwarz | 321—18 X |
| 3,569,819 | 3/1971 | Martzloff et al. | 321—12 |

WILLIAM M. SHOOP, Jr., Primary Examiner

U.S. Cl. X.R.

318—237; 321—2, 18